UNITED STATES PATENT OFFICE 2,367,878

BETAINE ESTERS

John Lee, Nutley, N. J., assignor to Hoffmann-La Roche, Inc., Nutley, N. J., a corporation of New Jersey No Drawing. Application May 4, 1939,
Serial No. 271,735

6 Claims. (Cl. 260—482)

My invention relates to betaine esters suitable for use in antiseptic, disinfecting, preserving and wetting preparations.

The compounds embraced by the present invention fall within the general formula

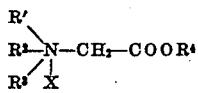

wherein $R'$ is an aliphatic (saturated or unsaturated) or cyclic (benzenoid or non-benzenoid) group; $R^2$ and $R^3$ are both aliphatic, of which at least one is a higher alkyl group of at least 9 carbon atoms; $R^4$ is a member of the class consisting of alkyl, aryl and aralkyl groups, except that when $R^4$ is cyclic, $R'$ is alkyl, while if $R'$ is cyclic, $R^4$ is an alkyl radical of fewer than 3 carbon atoms; and X is bromine or hydroxyl.

The compounds falling within the above general formula are particularly characterized by a strong antiseptic action, the phenol coefficients of the esters ranging from about 50 to above 500, which is rendered more valuable by the fact that the compounds are of low toxicity. The high antiseptic value of these compounds is in marked contrast to the relatively low antiseptic action of the free acid. Thus, as described in Example 2 hereinbelow, the ester diethyldodecyl-carboethoxymethylammonium bromide has about four times the phenol coefficient (about 20) of the corresponding acid (diethyldodecylcarboxymethylammonium bromide). The new esters prepared by me are accordingly powerful and at the same time safe antiseptics and disinfectants.

In carrying out my invention, I prefer to proceed as follows: Approximately combining proportions of a tertiary amine and an ester of bromo-acetic acid are mixed together at room temperature, or the mixture is warmed, as on the water bath, until reaction occurs. When the reaction is completed, the betaine ester is separated from unreacted starting material and other impurities, advantage being generally taken of the high water-solubility of most of the esters obtainable by the described process, as by distributing the reaction mixture between water and an organic solvent which is not miscible with water. The reaction product may be further purified by crystallization from an organic solvent, such as acetone, alcohol, etc.

The tertiary amines employed by me are those having an aliphatic group of at least 9 carbon atoms, the other substituents being either both of aliphatic nature or one aliphatic and one cyclic, the ring being either benzenoid or non-benzenoid.

The bromo-acetic ester may be of a cyclic alcohol, such as benzyl, cinnamyl, etc., or of an aliphatic alcohol; however, where the tertiary amine has a cyclic substituting group, the bromo-acetic ester of a cyclic alcohol will generally produce a product which is only slightly soluble or relatively insoluble in water and hence is less adapted for use as an antiseptic and wetting agent. Where, therefore, one of the reactants has a cyclic group, the other is preferably free of cyclic groups.

The tertiary amine may be prepared in any known or suitable manner. The esters of bromo-acetic acid have been found by me to give highly satisfactory results on reaction with such amines, the corresponding quaternary ammonium bases being readily formed.

If to the solution of the products an equivalent of alkali metal hydroxide is added, the bromine atom is replaced by a hydroxyl group. Such solutions are highly active and may be used directly.

The invention will be further described with the aid of the following examples, which are employed for purposes of illustration only and not as indicating the limits of the invention:

Example 1

14.3 g. benzylmethyldodecylamine and 8.35 g. ethyl bromo-acetate are warmed together on a water bath for 10 hours. This forms a viscous non-crystallizing material which is practically entirely water soluble. Traces of unreacted materials can be removed by dissolving the product in water, shaking with petroleum ether, and evaporating the aqueous layer to dryness. The purified product, which on analysis corresponds to the formula for benzylmethyldodecylcarboethoxymethylammonium bromide, is a yellowish transparent viscous substance, very soluble in water, with a neutral reaction, and with high antiseptic and dispersing properties. The product has the formula

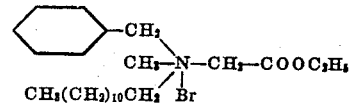

and has a phenol coefficient of about 200.

Example 2

2.4 g. diethyldodecylamine and 1.67 g. brom acetic ethyl ester are heated on a water bath to 80° C. for 3 hours. This on cooling forms a crystalline mush. It is insoluble in petroleum ether, soluble in ether. After rubbing with petroleum ether the reaction product, diethyldodecylcarboethoxymethylammonium bromide, forms a waxy crystalline paste, soluble in water. On hydrolysis with hydrobromic acid this material gives the corresponding acid, diethyl dodecylcarboxymethylammonium bromide, melting point 110–111° C., with a phenol coefficient of 20, whereas that of the ester is about 80.

*Example 3*

10.49 g. benzyl bromo-acetate and 11.08 g. dodecyldiethylamine are heated on a water bath until homogeneous. This requires about 16 hours. The product on cooling forms a glassy viscous mass, soluble in water, neutral in reaction. Analysis shows the material to be diethyldodecylcarbobenzoxymethylammonium bromide corresponding to the formula

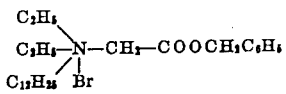

The phenol coefficient is about 65.

*Example 4*

8.15 g. phenyl bromo-acetate and 9.15 g. diethyldodecylamine are mixed and slightly warmed. A vigorous reaction occurs with evolution of much heat, and after first forming two layers the hot mass becomes crystalline in about 10 minutes. Recrystallized from acetone, a product is obtained having a melting point of 128–129° C. The diethyldodecylcarbophenoxymethylammonium bromide so formed is a white crystalline powder, fairly soluble in water, with a neutral reaction. The formula of the product is

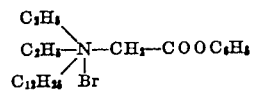

and its phenol coefficient is approximately 80.

*Example 5*

8.76 g. methyl bromo-acetate and 16.55 g. benzylmethyldodecylamine are heated together on a water bath for 4 hours. The product forms a viscous mass which on standing becomes a waxy, crystalline solid. The benzyldodecylmethylcarbomethoxymethylammonium bromide so formed is soluble in water with a neutral reaction, and has a phenol coefficient of about 216.

*Example 6*

42.1 g. dodecylbutylamine, boiling point 129° C., at 3 mms., 21.0 g. allyl bromide, and 9.0 g. sodium hydroxide, finely powdered, are heated together on an oil bath at 160° C. for 5 hours. The decanted liquid layer on fractionation at 3 mms. distils at 140–143° C. and consists of allylbutyldodecylamine. 6.82 g. of this amine and 4.05 g. ethyl bromoacetate are warmed together on a water bath for 3 hours. The resulting material is soluble in water, forming a hazy solution. The slight amount of unreacted substances can be removed by treating the product with petroleum ether. The allylbutyldodecylcarboethoxymethylammonium bromide so obtained is very water-soluble, forming clear solutions, neutral in reaction, and has a phenol coefficient of about 50.

*Example 7*

59 g. dodecyl bromide, 26.3 g. furfurylmethylamine, and 9.5 g. finely powdered NaOH are heated together on an oil bath at 140–150° C. for 5 hours. After cooling, the supernatant liquor is poured off and stood over KOH for 24 hours. On fractionating at 1.5 mms., a fraction boiling at 145–7° C. at 1.5 mms. is obtained which consists of furfurylmethyldodecylamine.

5.6 g. furfurylmethyldodecylamine and 3.04 g. methyl bromoacetate are mixed together. After a few minutes the temperature rises to about 70° C. and after standing for ½ hour the reaction mass consists of a pale yellow viscous fluid which is composed largely of furfurylmethyldodecylcarbomethoxymethylammonium bromide of the constitution:

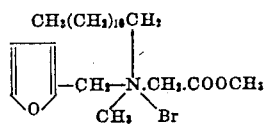

Further purification of the compound can be effected by taking it up in dilute alcohol, shaking out with petroleum ether, and evaporating the aqueous alcoholic solution to dryness. The substance is very soluble in water, forming a neutral solution with high frothing properties, and has a phenol coefficient of about 116.

*Example 8*

Theoretical quantities of benzylmethylamine and octadecyl bromide are reacted in the presence of the theoretical amount of NaOH at 150–160° C. for 6 hours. On fractionation of the supernatant liquid the material passing over at 210–230° C. at 1 mm. consists largely of octadecylmethylbenzylamine. 374 parts of octadecylmethylbenzylamine are mixed with 152 parts of methyl bromo-acetate. These materials form a clear solution without the generation of heat. After heating for 3 hours on a water bath the substance on cooling forms a white waxy solid. This consists largely of octadecylmethylbenzylcarbomethoxymethylammonium bromide of the formula:

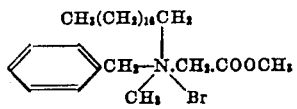

The reaction product, which contains about 94% of the above ammonium bromide, can be further purified by taking it up in 50% alcohol, extracting with petroleum ether, and evaporating the aqueous alcoholic layer to dryness, when the octadecylmethylbenzylcarbomethoxymethylammonium bromide is obtained in substantially pure condition. It is soluble in water, forming a neutral, frothing, highly germicidal solution with a phenol coefficient of 500–1000 by the Rideal-Walker method.

In a similar manner to the above, octyldiethylamine can be reacted with ethyl bromo-acetate to form octyldiethylcarboethoxymethylammonium bromide; octadecyldiethylamine will react with ethyl bromoacetate to form octadecyldiethylcarboethoxymethylammonium bromide; oleyldialkylamines can be reacted with bromo-acetic ethyl esters to form oleyldialkylcarboethoxymethylammonium bromides, and so on. The higher alkyl chain can be interrupted with O, S or NH atoms or groups.

The above materials are suitable for use as antiseptics in high dilutions. For example, in dilutions as low as 1:20,000 they are active against staphylococci, B. typhosis, and other pathogenic organisms. The materials also have a high activity against molds and are therefore designed for use as disinfecting and preserving agents, for the sterilization of instruments, for the treatment of wounds, and the like. On account of their saponaceous character, their surface tension being quite low, the solutions of the products are of high penetrating power.

I claim:

1. An antiseptic preparation comprising as an active germicidal ingredient a compound of the general formula

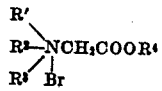

wherein $R'$ is a cyclic radical; $R^2$ and $R^3$ are both aliphatic, of which at least one is a higher alkyl group of at least 9 carbon atoms; and $R^4$ is alkyl.

2. An antiseptic preparation comprising as an active germicidal ingredient a compound of the general formula

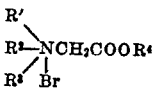

wherein $R'$ is furfuryl; $R^2$ and $R^3$ are both aliphatic, of which at least one is a higher alkyl group of at least 9 carbon atoms; and $R^4$ is alkyl.

3. An antiseptic preparation comprising as an active germicidal ingredient a compound of the general formula

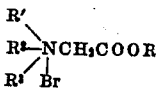

wherein $R'$ is benzyl; $R^2$ and $R^3$ are both aliphatic, of which at least one is a higher alkyl group of at least 9 carbon atoms; and $R^4$ is alkyl.

4. Benzylmethyldodecylcarboethoxymethylammonium bromide.

5. Compounds of the general formula

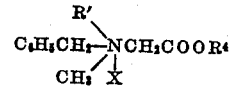

wherein $R'$ is an alkyl group of 12 to 18 carbon atoms, $R^4$ is an alkyl radical of less than 3 carbon atoms, and X is a member of the group consisting of bromine and hydroxyl.

6. Process for the manufacture of betaine esters containing a cyclic group comprising reacting a compound of the general formula

wherein $R'$ is cyclic, and $R^2$ and $R^3$ are alkyl, one of $R^2$ and $R^3$ containing at least 9 carbon atoms, with a compound of the general formula

$BrCH_2COOR^4$ where $R^4$ is a member of the group consisting of methyl and ethyl.

JOHN LEE.